United States Patent Office 3,173,286
Patented Mar. 16, 1965

3,173,286
METHOD OF OPERATING A PRESSURE FLUID-OPERATED PRESS AS A HAMMER AND PRESSURE FLUID-OPERATED PRESS SERVING FOR CARRYING OUT THE METHOD
Helmut Dischler, Neuss-Udesheim, Germany, assignor to Maschinenfabrik Hasenclever Aktiengesellschaft, Dusseldorf, Germany
Filed Jan. 15, 1962, Ser. No. 166,185
Claims priority, application Germany, Jan. 19, 1961, M 47,732; July 28, 1960, M 49,850
9 Claims. (Cl. 72—453)

Mechanical and pressure fluid-operated presses and hammers are used for cold- and hot-forming materials. The presses consist generally of hydraulic presses. Presses distinguish by transmitting forces in a closed cycle practically without free mass forces of any significance. Hence, presses will hardly transmit a shock to the foundations. This is different with hammers. The action of hammers is due to the fact that a heavy mass, in most cases a falling weight, is accelerated to a high speed. Quick braking by means of the workpiece causes a transmission of the energy contained in the mass during a short movement with a great increase in force. The increase in force is transmitted to the foundation as a shock. This is the essential reason for the fact that hammers while being inherently simpler than presses cannot be used everywhere. In individual cases the high speed with which the masses impinge on the workpiece may cause presses to be preferred to hammers.

It is an object of the present invention so to design pressure fluid-operated presses that the advantages of a press can be combined with those of a hammer. The advantages can be combined when during operation as a hammer the accelerated mass is caused to act onto the workpiece by means of a mechanical or desirable pressure fluid operated energy transformer. This results in two essential advantages compared to hammers. The shock on the foundation is reduced in accordance with the transformation of energy and the speed of impact is reduced in the same proportion. Owing to the reduction of the shock, forging can be carried out with such a press more exactly than with hammers. As compared to known mechanical presses there is the advantage that overloading, e.g., by an incorrect setting of the stroke or the special shape of the workpiece, cannot occur. Compared to the known hydraulic forging presses there is the advantage that the stroke frequency can be much increased, a high efficiency is obtained and the drive means are relatively small and compact. When operated with pressure accumulators, forging presses will always require a pressure fluid at an invariable pressure, corresponding to the pressure of the press, independently of the resistance to forging. Since the resistance gradually increases as the tool penetrates the workpiece and in many operations is only rarely as high as the pressure imparted to the pressure fluid, a large part of the energy contained in the pressure fluid will be lost and will be converted into heat by throttling of the fluid. When the press is directly driven by pumps or where drivers are used, there will be no dissipation of energy but very large pumps or drivers having high driving powers are required for this purpose.

The method proposed to solve this problem to operate a pressure fluid-operated press as a hammer is characterized according to the invention in that a liquid column consisting preferably of the working fluid of the press and having a relatively small cross-section is suddenly accelerated, this highly accelerated liquid column is used to impart to a liquid column of relatively large cross-section an acceleration which is reduced in accordance with the ratio of the cross-sections, and the energy of the liquid column of relatively large cross-section is transformed into deforming work at the workpiece. It is obvious that the method can be repeated with more than two liquid columns having different cross-sectional areas. The liquid column having a relatively small cross-section may be accelerated in various ways. This may be effected by mechanical means. Alternatively, the liquid column having a relatively small cross-section may be accelerated by the action of a pressure fluid. In the first place, free heavy masses initially prevented from moving under the action of the force of gravity may be suddenly subjected to such force and caused to act on the liquid column of relatively small cross-sectional area to suddenly accelerate the same. In the second of the above-mentioned methods a liquid column of smallest cross-section is suitably highly accelerated and is suddenly caused to act on the liquid column having a relatively small cross-sectional area. In another alternative, liquid columns of smallest cross-section may be used to cause an action of heavy masses on liquid columns of a cross-section which is suitably of an area between that of the smallest and the relatively small cross-sections and the liquid column which is thus suddenly accelerated may be used to accelerate the working fluid column of relatively large cross-section. The so-called counterblow method is employed when heavy masses are caused to act in at least two different directions and preferably simultaneously and in mutually opposite directions on the liquid column having a cross-sectional area between the smallest and the relatively small cross-section.

The method has the great advantage that selectively either a column having a relatively small cross-section, which consists of the working fluid of the press, is suddenly accelerated and when thus accelerated is used to impart to another liquid column having a relatively large cross-section, an acceleration which is reduced in accordance to the ratio between the cross-sections, and the energy content of this relatively large column is transformed into deforming work on the workpiece, as in the case of a hammer, or the liquid column having a relatively large cross-section is directly accelerated, if desired, with the aid of the liquid column of relatively small cross-section, which is only gradually accelerated under the action of heavy masses, and the energy content of the liquid column of relatively large cross-section is transformed into deforming work on the workpiece, as in the case of a press. In the latter case, the pressure fluid-operated press may even be operated at a high speed to obtain the above-mentioned higher stroke frequency compared to known hydraulic presses. In both cases, the counterblow method may be employed, as has been explained hereinbefore.

Pressure fluid-operated presses for carrying out the proposed methods may be desired in various ways. They are preferably characterized in that the ram of the press consists of a hollow piston and in its cavity accommodates a tubular piston. The tubular piston may carry a falling weight, although this is not essential. The falling weight may be replaced by heavy masses in general, which are accelerated as required. Where the counterblow method is employed, the tubular piston forms suitably a guide for a retracting piston. In the former case, the tubular piston is suitably guided by a tubular member which is coaxial and centrally disposed with respect to the hollow and tubular pistons and which is closed at one end and supported and has connected to it a conduit which comes from a pressure fluid pump and contains a shut-off valve. In this case, the hollow piston has suitably associated with it a retracting cylinder and a retracting piston associated with it and the retracting piston is connected to the hollow piston preferably by means of a piston rod and a cross-member. To achieve a further improvement of the machine described hereinbefore and to simplify its construction, it is proposed to provide the ram in the form of a piston rod which is guided in the press frame and has a cavity into which the plunger extends.

The piston rod serving as a ram may be guided in the press frame above and below the press piston carried by the piston rod. The plunger extending into the cavity of the piston rod is suitably guided in the upper part of the piston rod.

In a development of the invention it is desirable to provide for an open communication between the cylinder space disposed above the press piston and the cavity of the piston rod. The cylinder space of the press piston may have connected to it an accumulator, which contains pressure fluid under a pressure which is sufficient to hold the plunger in its upper position until the ram impinges on the workpiece. The upper and lower spaces of the press piston cylinder may be interconnected by a conduit which contains a check valve.

To cause the ram to perform lifting and lowering movements, plunger cylinders are suitably provided and the supply of pressure fluid to and its discharge from said plunger cylinders can be controlled in accordance with the desired speed of the ram.

Pressure fluid under accumulator pressure is supplied during the pressing operation to a valve-controlled pump connected to the cylinder space of the press piston, which pump forces this oil under elevated pressure into the upper cylinder space so that the press piston and the ram are moved downwardly to perform work and the plunger is forced into its upper limiting position.

A shut-off valve may be incorporated in the conduit which connects the upper cylinder space and the cavity of the piston rod to enable the shutting-off of this conduit when the accumulator is empty.

To cause the plunger to move relative to the piston rod in order to reduce the speed at which the ram impinges on the workpiece, that part of the piston rod which is disposed above the press piston may be smaller in diameter than the portion below the piston and a valve may control the accumulator so that the latter is shut off shortly before the ram impinges on the workpiece.

Further details of a press designed according to the invention and its controls will be described hereinafter with reference to illustrative embodiments shown in the drawings.

Figure 1:
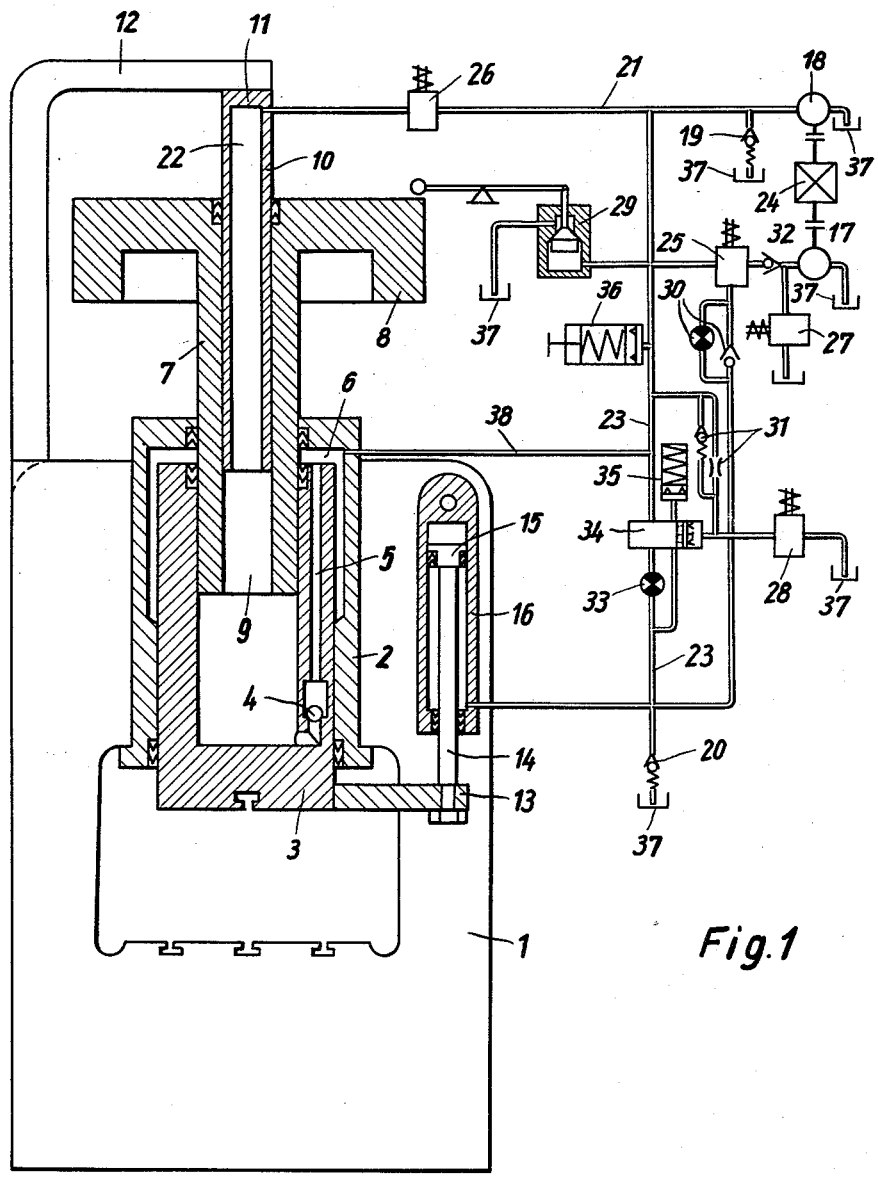
FIG. 1 is a diagrammatic view showing a pressure fluid-operated differential hammer press.

FIG. 1 shows a press frame 1, a cylinder 2 which is arranged in a frame 1 and contains a hollow piston 3, constituting the ram of the press and a check valve 4 disposed in the press piston 3 and having a bore 5 communicating with a pressure space 6 disposed between the guide cylinder 2 and the hollow piston 3. 7 is a tubular piston which serves for transforming energy and is guided in the press piston 3. Piston 7 is designed at 8 to form a heavy falling weight. A central cavity 9 in the tubular piston 7 accommodates a guide tube 10, which is closed at one end 11 and supported by the press frame 1 at 12. The press piston 3, which constitutes the ram of the press when the same operates as a hammer, is connected by a cross-member 13 to a piston rod 14 of a retracting piston 15, which is slidably guided in a retracting cylinder 16. The retracting cylinder 16 is disposed at the press frame; alternatively, it could form a part of or be disposed in the press frame.

In the present embodiment it is assumed that the pressure fluid consists of pressure oil. This pressure oil may be replaced by any other working liquid unless a pneumatic operation of the press is desired.

In accordance therewith, the hydraulic system of the press shown in FIG. 1 comprises a pressure oil pump 17 and a leakage oil pump 18. Relief valves 19 and 20 are incorporated in a conduit 23 and in a conduit 21 connecting the leakage oil pump 18 to a cavity 22 confined by the guide tube 10. A motor 24 drives the pressure oil pump 17 as well as the leakage oil pump 18. 25 is a two-way magnetic valve. 26, 27 and 28 are one-way magnetic valves. An overflow valve 29 is mechanically controlled by the falling weight 8. 30 indicates a valve unit combining a throttle valve and a check valve and having an adjustable throttle. 31 is a valve unit comprising a throttle valve and an initial pressure-setting valve. This valve unit need not be adjustable. A check valve is indicated at 32. An adjustable throttle valve 33 is suitably a flow rate regulator. 34 is a hydraulically controlled two-way valve, to which a pressure storage means 35 is connected, which consists of a spring-loaded accumulator. Another spring-loaded accumulator is indicated at 36. The threshold pressure of this accumulator is adjustable. 37 are return flow vessels, which may be connected to a common return flow conduit. A conduit 38 connects a space 6 between the cylinder 2 and the hollow piston 3 to conduit 23. Whereas the further pipe connections are not provided with reference characters for the sake of clarity, the points where the pipe conduits are connected are emphasized by a dotlike enlargement.

The pressure fluid-operated press shown in FIG. 1 has the following mode of operation:

The various pistons are shown in their initial position. The leakage oil pump 18 ensures that leakages occurring at the pistons and in the valves during prolonged inoperative periods cannot permit a slow descent of the falling weight 8 and hollow piston 3. Relief valve 19 is set to the highest pressure required and will release any higher pressures to the container 37. The working pump discharges oil under no pressure through the open valve 27 back into container 37. The magnetic one-way valve 26 is opened, the one-way valve 28 is closed. The two-way valve 25 shuts off the conduit leading to valve 29 whereas the conduit to the throttling and check valve 30 is open.

*Operations during forging (drop-forging)*

An electric push button, not shown, is actuated to cause valve 28 to be opened for a short time while valve 27 remains closed for the time being. The short-time opening of valve 28 causes pressure oil to escape through the hydraulically controlled two-way valve 34. A return spring arranged in this valve urges the valve to its open position. This opens the conduit from the flow rate regulator 33 whereas the conduit to the accumulator 35 remains closed.

As cylinder 16 has a smaller cross-sectional area than cylinder 2, the pressure oil in the former has a much higher pressure than that in cylinder 2 and flows into the latter through flow rate regulating valve 33 and valve 34. This will suddenly release the falling weight 8 to move downward at high speed together with its piston 7. The retracting forces exerted in cylinder 16 on piston 15 are relatively small compared to and overcome by those in space 6 so that piston 3 is rapidly depressed. In accordance with the ratio between the cross-sectional areas of pistons 3 and 7, however, the descent of piston 3 will be slower than the movement of piston 7. This movement of pistons 3 and 7 relative to each other will force oil from the cavity enclosed by piston 3 through check valve 4 and bore 5 into space 6.

When impinging on the workpiece, the piston 3 is braked as well as the falling weight 8. This retardation results in a strong rise in pressure, so that the entire energy contained in the descending parts is transformed into static pressure, which causes a corresponding deforming work to be performed at the workpiece.

The resulting forces will depend on the elasticity of the workpiece and of the cylinders and conduits involved and of the pressure fluid, i.e., the oil itself.

The spring-loaded accumulator may be set to limit the maximum pressure without loss because when the set value has been reached, the pressure oil from the cylinder 3 will overcome the spring stress and flow off into the accumulator 36.

The load on the press frame 1 equals the product of the maximum oil pressure and the difference between the cross-sectional areas of pistons 3 and 7.

The foundation is only loaded by a force which equals the product of the maximum oil pressure and the cross-sectional area of piston 7. When pistons 3 and 7 transform energy at a ratio of about 5:1, a setting of accumulator 36 to 300 tons will result in a blowing force of 300 tons and a load of only 60 tons on the foundation. The maximum speed of the descent of pistons 3, 7 can be set with the flow rate regulator 33.

Flow rate regulator 33 limits the rate of oil flowing through it. This enables the setting of an optimum energy level in each case, which is just sufficient for forging while an undue wear of the dies is avoided.

When the impact of piston 3 on the workpiece causes the pressure to rise above the pressure required to overcome the opposing spring force of the throttling and initial pressure setting valve 31, pressure oil will enter the hydraulically controlled two-way valve 34 to reverse the same. The oil discharged by pump 17 can no longer flow through this valve 34 into cylinder 2, but will now act on piston 15 of the retracting cylinder 16. This piston is thus rendered effective and piston 3 is retracted to its initial position. The elasticity of the oil in the cylinders and in accumulators 36 will assist the return movement of piston 3 to its initial position. Relief valve 20 will respond as soon as the pressure in the pump conduits exceeds the set value.

The return of piston 3 causes piston 7 to return at a higher speed according to the transformation of energy because the oil in cylinder 2 is forced through valve 26 and guide tube 10 into the cavity of piston 3.

If the elasticity of the oil, the cylinder walls, the pipelines and the accumulator 36 caused at certain times a more rapid upward movement of piston 7 and the falling weight 8 than under the action of pump 17 alone, a vacuum would result inside piston 3. This could enable an entrance of air, which might cause disturbances during the next downward stroke of piston 3 by creating an excessively high elasticity so that the required pressing or blowing pressure might not be attained. In order to prevent this, accumulator 35 is connected to the system when the by-pass conduit from cylinder 16 to cylinder 2 is closed by the hydraulically controlled two-way valve 34. This accumulator contains pressure oil in an amount which is at least sufficient to avoid the formation of a vacuum. Because oil flows out of cylinder 16, the oil discharged by the pump flows into cylinder 2 during the downward movement of pistons 3, 7, and the oil from pump 18 is also effective during the upward movement of the pistons, piston 7 will reach its initial position before psiton 3. To prevent a return movement of piston 7 beyond its initial position and to maintain it constantly in this initial position and further to enable an escape of any air which may have accumulated, the falling weight 8 is arranged to actuate relief valve 19 so that surplus oil and any air which has entered can escape. The final position of piston 3 can be set by a switch, which is not shown. The operation of this limit switch causes the opening of valve 27 so that pump 17 discharges under no pressure. As a result, piston 3 remains in position because it does not receive additional oil from cylinder 16. Check valve 32 prevents a downward movement of the piston 3 in this phase.

It may be mentioned that a constriction in the initial pressure-setting and throttling valve unit 31 is provided to reliably prevent a change in the position of valve 34. Without such a constriction, oil leakage from valves 28 and/or 34 would inevitably result in a change in the position of valve 34. The initial pressure-setting valve 31 has the function of effecting a reversal only when piston 3 impinges on the workpiece.

Operations during pressing

The hydraulic press shown in FIG. 1 has the further property that it is suitable for all work previously performed on hydraulic presses.

For this purpose, the throttling and check valve unit 30 is provided. A high speed of the downward movement can be continuously adjusted at the constriction of this valve unit.

When an electrical push button, not shown, is operated to move the magnetic valve 25 to a position in which the conduits connected to it are open, the falling weight 8 will urge piston 3 and retracting piston 15 downwardly at the set speed. On the other hand, when the magnetic valve 25 is in a position in which the conduit from pump 17 to valve 29 is closed, piston 3 will be stopped and pump 17 will cause pistons 15, 3 and 7 to be retracted to their initial position provided that valve 27 is closed.

The pressing stroke is initiated by closing the valve 26, causing the two-way valve 25 to close the unit through the throttling and check valve 30 and to open the other conduits, and closing the valve 27. The oil discharged by pump 17 flows into cylinder 2 so that piston 3 is depressed in dependence on the discharge of pump 17. Even under the maximum pressure, the piston 7 and the falling weight 8 cannot yield upwardly because pressure oil cannot flow into space 9 and the cavity of the hollow piston 3. Piston 7 and weight 8 are descending at the same speed as piston 3.

The piston arrangement is retracted in response to valve 25 opening the conduit leading to valve unit 30, and closing the conduit to valve 29 while valve 26 is opened.

The forces generated during pressing are smaller than those generated during forging in accordance with the ratio between the cross-sectional area 7 and the cross-sectional area of the hollow piston 3.

Figure 2:
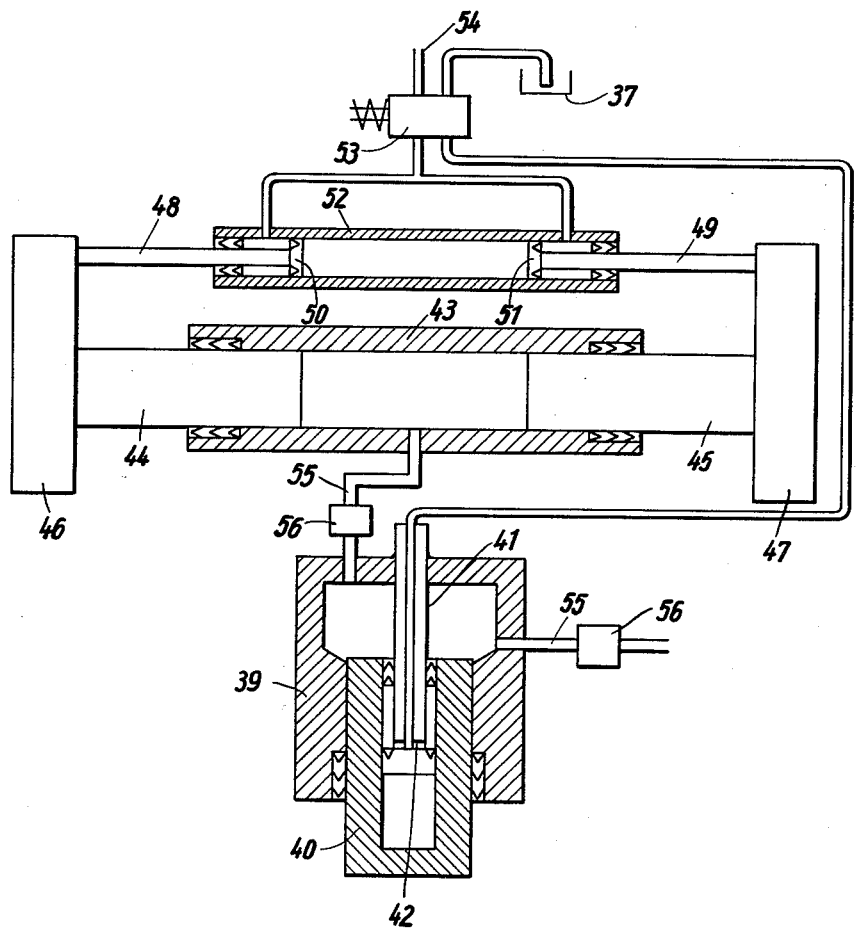
FIG. 2 is a similar view of a double-acting differential hammer press employing the counterblow method, the controls shown in FIG. 1 being omitted.

FIG. 2 shows a counterblowing, double-acting differential hammer press while the press frame is not shown in this figure, in which the controls shown in FIG. 1 have also been omitted for the sake of clarity. A press cylinder 39 is firmly anchored in the press frame and guides a hollow piston 40, in which a tubular piston 41 is guided which forms a guide for a retracting piston 42. A pre-pressing cylinder 43 is firmly arranged outside the press frame.

Pistons 44, 45 carrying the heavy blowing masses 46, 47 are slidably guided in the pre-pressing cylinder 43. These masses are controlled by piston rods 48, 49, which connect pistons 50, 51 to the blowing masses 46, 47. The pistons 50, 51 slide in a cylinder 52, which has desirably the smallest cross-section whereas the cross-sectional area of cylinder 43 is intermediate the cross-sectional areas of the cylinders 39 and 52. A magnetic four-way valve 53 has connected to it a conduit 54 to an accumulator with pump and controls. The oil return conduit is indicated at 37.

The press shown in FIG. 2 has the following mode of operation:

Instead of the falling weight 8 of the press shown in FIG. 1, the masses 46, 47 with pistons 44, 45 are now accelerated by means of pistons 50, 51 and piston rods 48, 49. The energy imparted to masses 46, 47 depends on their final velocity. The acceleration depends on the capacity of the accumulator connected by conduit 54 to the magnetic valve 53. A pressure oil pump which corresponds to the pump 17 in FIG. 1 serves for filling the accumulator and for retracting the weights. The pressure fluid suddenly displaced by pistons 44, 45 flows through a connecting conduit 55 provided with a shut-off valve 56 into cylinder 39 so that piston 40 is caused to impinge on the workpiece at a correspondingly reduced speed.

The oil on the pulling side of the retracting piston 42 incorporated in the tubular piston 41 flows through valve 53 into container 37 and into the return conduit for the pressure oil. This causes piston 42 to return to its initial position. The returning piston 40 displaces the oil from cylinder 39 into cylinder 43 so that pistons 44, 45 and masses 46, 47 are returned to their initial position.

When the shut-off valve 56 between cylinders 43, 39 is closed, the counterblowing hammer press shown in FIG. 2 will operate as a hydraulic press. For this purpose, the cylinder 39 is connected to the pressure oil pump 17 of FIG. 1 by a special conduit 55, which incorporates a shut-off valve 56.

All further measures, such as the adjustment of pressure and energy, can be performed with the means shown in FIG. 1. A construction as shown in FIG. 2 has the special advantage that the blow cannot result in shock due to free mass forces.

Figure 3:
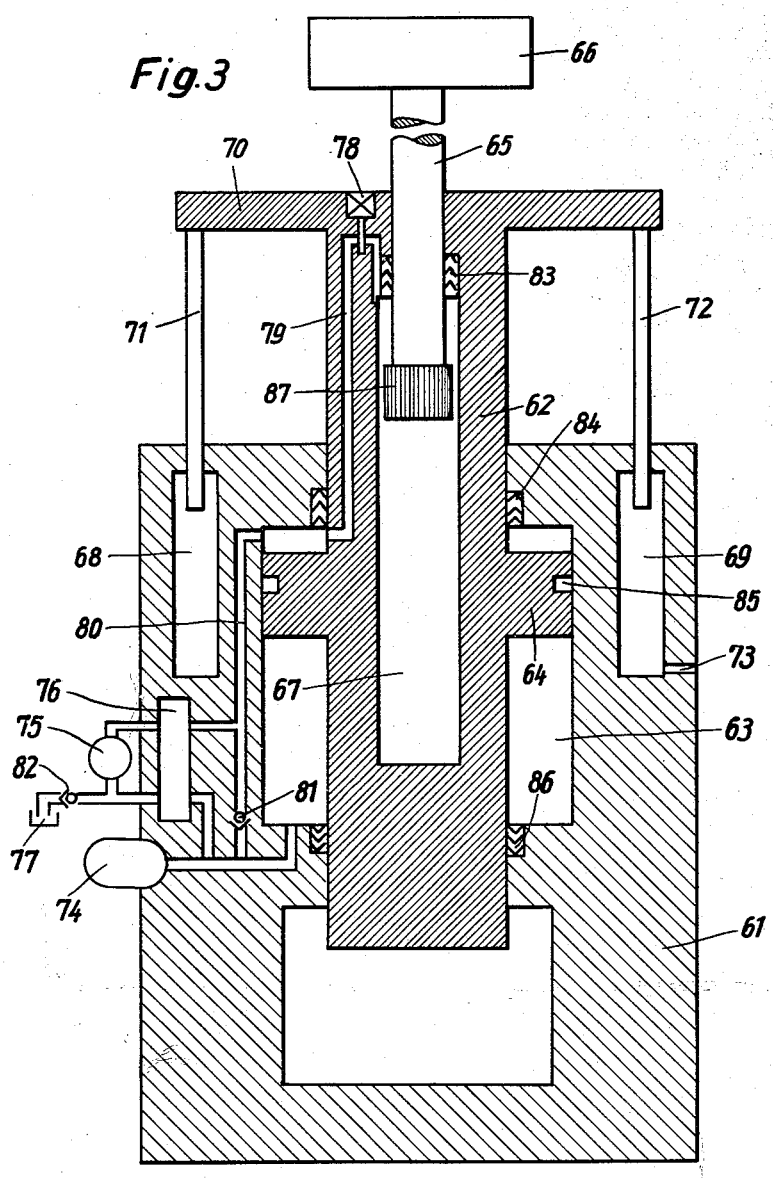
FIG. 3 is a sectional view showing another embodiment of the invention.

The hammer press constructed according to FIG. 3 comprises a press frame 1, which guides a ram consisting of a piston rod 62. A press piston 64 attached to piston rod 62 is guided in a cylinder space 63. A plunger 65 guided in the upper portion of piston rod 62 is provided with a falling weight 66 and received by a cavity 67 in piston rod 62. Two plunger cylinders 68 and 69 are connected to an oil supply conduit 73 and receive plungers 71 and 72, which are connected by a cross-member 70 to piston rod 62. The cylinder space 63 has connected to it an accumulator 74 and a pump 75 provided with a magnetic multiway valve 76 and a return flow receiver 77. A shut-off valve 78 is incorporated in a conduit 79 between the upper space of cylinder 63 and cavity 67. A conduit 80 incorporates a check valve 81. A check valve 82 is provided before the return flow receiver 77. Gaskets are indicated at 83, 84 and 85. A collar 87 on plunger 65 serves as a stop. Conduit 73 is connected by a valve, not shown, to the pressure conduit and the return flow conduit.

This hydraulic hammer press has the following mode of operation:

Press piston 64 is urged to its upper initial position by plungers 71 and 72 or by another lifting device, which may alternatively be mechanically operated. Valve 78 in conduit 79 is open for the time being. Accumulator 74 is charged with pressure oil at a pressure sufficient to urge plunger 65 with the weight 66 to its upper initial position, in which stop 87 is in engagement.

When a suitable valve, not shown, is operated to cause pressure oil to flow from conduit 73 into the return flow conduit, piston rod 62 will drop freely or descend at a lower speed depending on whether the flow of oil is throttled or free. The acceleration can be increased, as desired, by the use of suitable means. The oil in the lower space of cylinder 63 is displaced through check valve 81 and conduit 80 into the upper space of cylinder 63.

When piston rod 62 has the same diameter at the top and bottom, a longitudinal force cannot be generated by the pressure in cylinder 63. The following discussion will first deal with the case in which the piston rod 62 has the same diameter above and below the press piston. In this case, the plunger 65 will move at the same speed as the piston rod 62 and will be constantly urged against the upper stop by the pressure in accumulator 74.

When engaging a workpiece, the piston rod 62 is braked for an instant whereas the heavy mass 66 causes plunger 65 to continue its movement at the same speed so that oil is forced through conduit 79 into the upper space of cylinder 63. In accordance with the transmission ratio (ratio of area of plunger 65 to area of cylinder 63 less area of piston rod 62) the piston rod 62 will continue its movement at a lower speed than the plunger 65. Depending on the amount of work absorbed by the workpiece, a relatively high oil pressure will be generated, which urges the piston rod or ram 62 onto the workpiece with a great force.

The above-mentioned transmission ratio may be very high, for instance, 1:10 so that the shock force exerted on the foundation is only one eleventh, as contrasted with hammers, and the press does not require a large foundation. Ten eleventh of the force are statically taken up by the press frame.

Check valve 81 is provided to enable the build-up of a high oil pressure in the upper space of cylinder 63. When the piston rod 62 has engaged the workpiece and check valve 81 has been closed, the oil in the lower space of cylinder 63 is displaced into the low-pressure accumulator 74. Valve 76 closes the conduits connected to it and is arranged to enable pump 75 to discharge under no pressure. Pump 65 is not required until pressing is performed.

When the pressure in space 67 has reached a predetermined value after the ram has engaged the workpiece, the valve in conduit 73 is changed over to cause plungers 71 and 72 to urge the piston rod 62 to its initial position. Now the oil displaced into accumulator 74 after valve 81 was closed can flow through the latter to the upper space of cylinder 63 to urge the plunger 65 to its limiting position. As a result, there will be no loss. Care must only be taken to ensure that the initial pressure of oil always prevails in the accumulator 74.

The piston rod 62 engages the workpiece at a relatively high speed. When this piston rod is very heavy, its engagement with the workpiece will cause a considerable transformation of energy and generate a shock. However, the weight of the piston rod is usually of minor significance.

When the piston rod 62 or ram must be very heavy for special reasons, the surface area of the upwardly projecting portion of the piston rod 62 may be somewhat smaller than the surface area of its downwardly projecting portion. This will ensure a relative movement of the plunger 65 when the piston rod 62 descends so that when the plunger 65 moves at the same speed as before and the same energy is transmitted as before, the piston rod 62 moving at a lower speed will transmit less energy and create a smaller shock. In this case, the accumulator 74 must be arranged so that it will not discharge oil into the upper space of cylinder 63 during the descent of piston rod 62.

To reduce the stroke of plunger 65, the accumulator 74 may be arranged to force oil into the upper space of cylinder 63 during a predetermined portion of the stroke and to interrupt the discharge of oil shortly before the workpiece is impinged while the accumulator is adapted to receive oil from the lower space of cylinder 63 when the piston rod 62 impinges on the workpiece. Instead of a specially designed accumulator, a normal accumulator may be used if a valve serves for connecting and disconnecting the accumulator.

The hammer press according to the invention may also be operated strictly like a hydraulic press. The speed of the descent of the piston rod 62 can be adjusted by throttling the flow of oil from conduit 73. The return flow may be effected by a variable or non-variable pump which discharges pressure oil into conduit 73. The actual pressing stroke is effected by means of pump 75, which may also be used for supplying presure oil into conduit 73.

In this case, the valve 76 is connected to open the previously closed conduits to cylinder 63. Pressure oil is now sucked by the pump from the lower space of cylinder 63 or supplied under accumulator pressure and discharged into the upper space of the cylinder 63.

If the diameter of the upper portion of the piston rod exceeds that of the lower portion and the accumulator 74 is not large enough, the valve 78 must be provided to close the conduit 79 when the accumulator is empty.

During press operation, the collar 87 of plunger 65 will always engage the stop at the seal 83 during the high-speed descent and during the return movement provided that the accumulator 74 is large enough or the valve 78 is closed.

Figure 4:
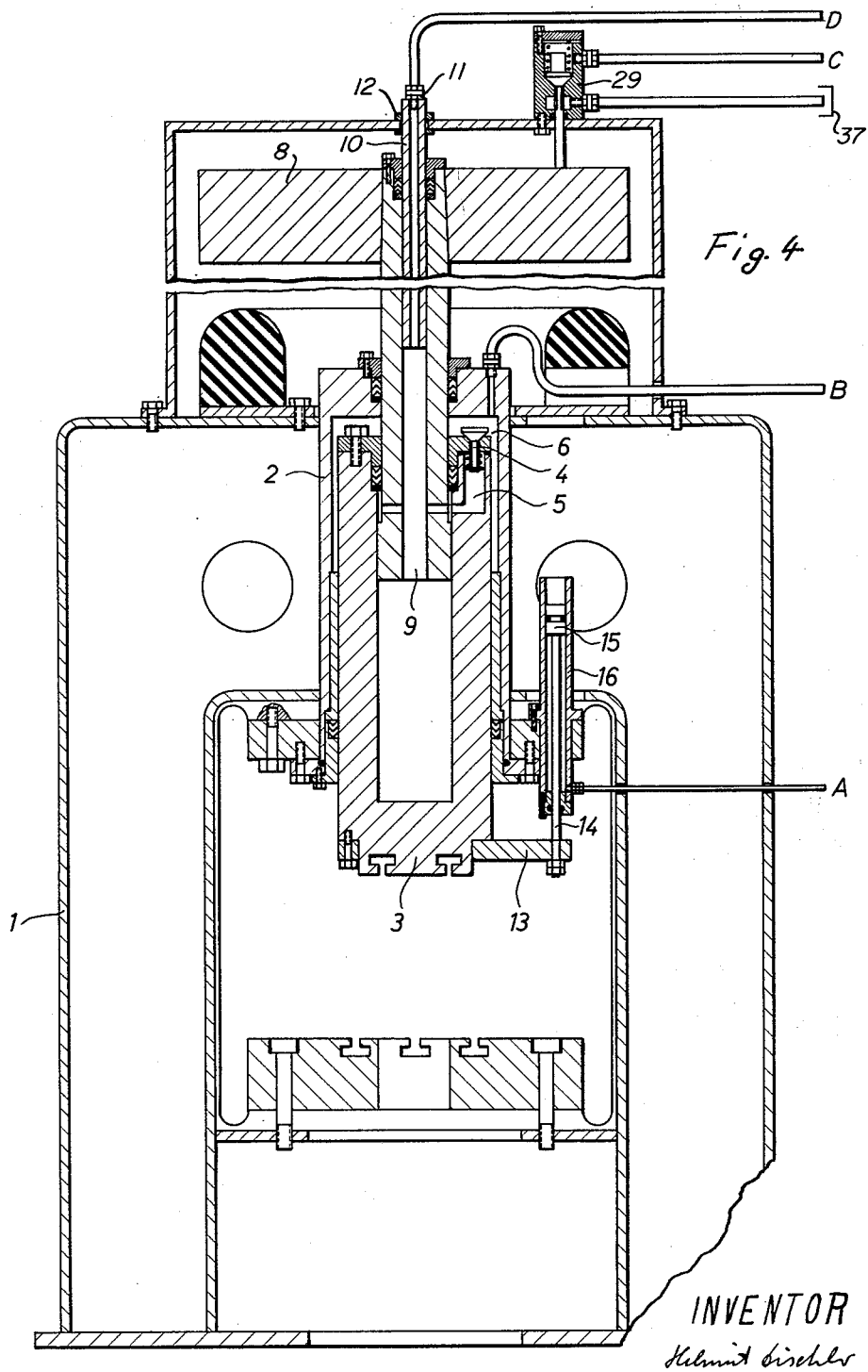
FIG. 4 shows the design of a differential hammer press according to the diagram of FIG. 1.
Figure 5:
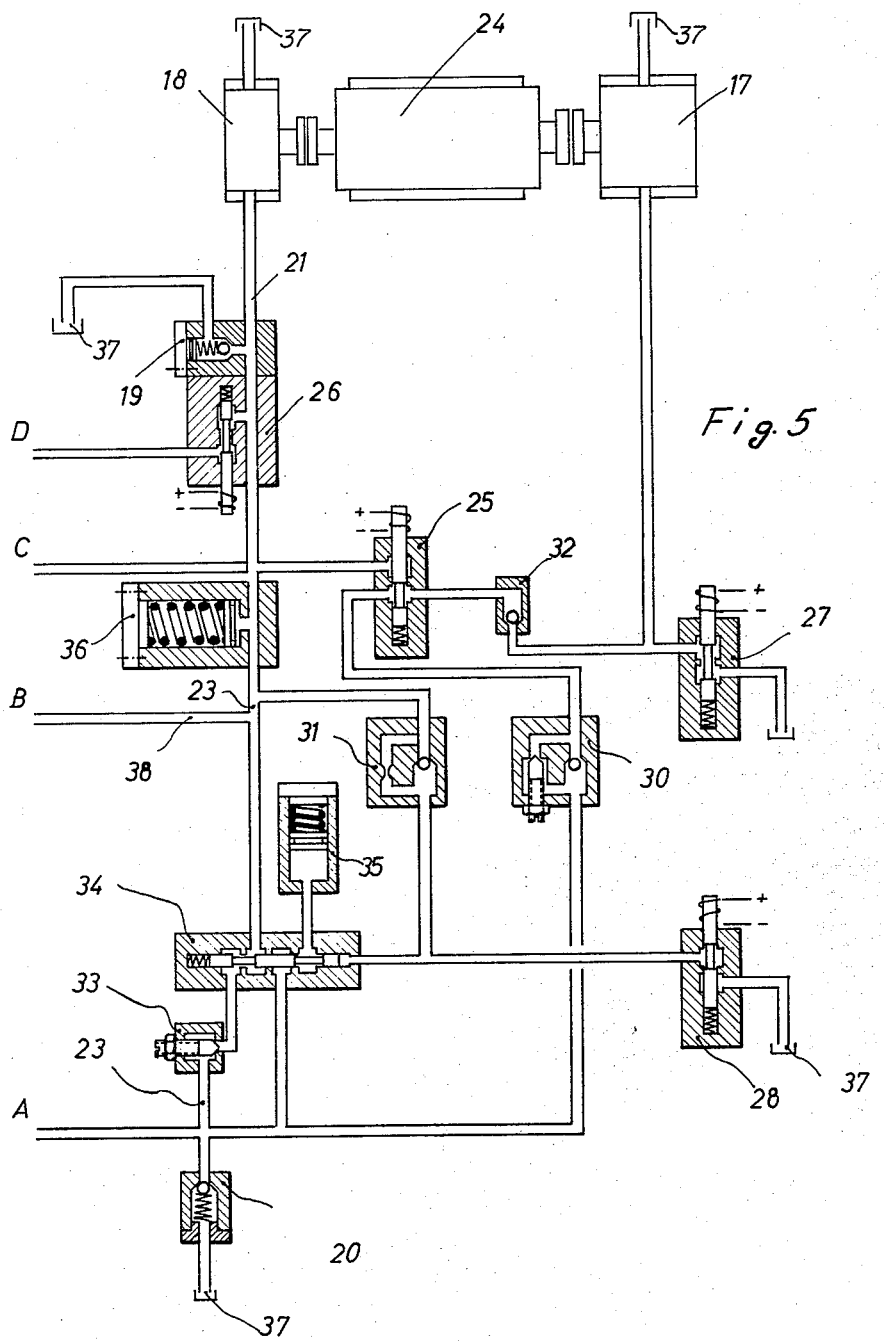
FIG. 5 illustrates the controls in the pressure fluid system.

In FIGS. 4 and 5, parts having the same reference characters as in FIG. 1 have the significance stated in connection with FIG. 1. FIGS. 4 and 5 correspond to each other inasmuch as the conduits A, B, C and D of the hammer press shown in FIG. 4 are connected at the points provided with these reference characters to conduits having the same reference characters in FIG. 5.

It is inherent in the nature of the invention that it is not restricted to the illustrative embodiments shown.

What is claimed is:

1. In a fluid operated forging press, in combination, a machine body; a ram forming a hollow piston reciprocably mounted in said machine body and having force-transmitting surfaces adapted to be exposed to a pressure fluid, said surfaces being adapted to respond to admission of pressure fluid to them to produce reciprocation of the ram; a heavy mass mechanically independent of said ram; means adapted to move the heavy mass; means adapted to suddenly subject a pressure fluid to which said force-transmitting surfaces of said ram are exposed to the action of said moved mass, said last mentioned means having force-transmitting surfaces the effective portions of which are smaller than said force-transmitting surfaces of said ram which are exposed to pressure fluid; at least one piston-cylinder arrangement; a pressure fluid connection to the cylinder of said arrangement; conduit means between said ram and said piston of said arrangement, said piston connected to said ram and adapted to return the ram when the latter has performed the working movement serving to deform the workpiece; a valve in said conduit and having a movable part with force-transmitting surfaces adapted to be exposed to the pressure fluid, said valve being adapted to assume one of two limiting positions in dependence on the pressure of the fluid and to move in response to an increase of the resistance of the workpiece to deformation beyond the maximum from a position in which the pressure fluid acts on one of the force-transmitting surfaces of the ram to the other limiting position in which the working fluid is admitted to the piston of the piston-cylinder arrangement so that the ram is automatically returned by said piston from the working to its initial position.

2. A press as set forth in claim 1, in which the means for moving the heavy mass comprises a plunger which is guided in the ram, the heavy mass consitsing of a falling weight, said falling weight forming a top end portion of said plunger.

3. A press as set forth in claim 1, in which the means for moving the heavy mass comprises of a plunger which is guided in the ram, an open-ended axial cavity in said plunger, a tubular member accommodated in said cavity and closed at one end, at which said member is connected to said machine body, said tubular member having a connection for pressure fluid, the heavy mass consisting of a falling weight, said falling weight forming a top end portion of said plunger.

4. A press as set forth in claim 1, said press further comprising a device adapted to arrest the heavy mass in at least one limiting position of its movement.

5. A press as set forth in claim 1, said device consisting of an overflow valve for working fluid, which valve is disposed in the path of the moving heavy mass.

6. A fluid operated forging press as set forth in claim 1 and including a presure fluid accumulator operatively connected to said conduit means; a check and throttle valve unit; and passage means connecting said accumulator and said valve unit.

7. In a fluid operated forging press, in combination, support means having a supporting surface adapted to support a workpiece; upright cylinder means mounted on said support means and having an open end facing said supporting surface; hollow ram means reciprocably mounted in said cylinder means and having a closed end facing said supporting surface and defining between the other end thereof and the other end of said cylinder means a first pressure space; plunger means having a heavy mass extending through said other end of said hollow ram means in the latter and having in said hollow ram means a piston defining between said piston and said closed end of said ram means a second pressure space adapted to be filled with pressure fluid; passage means connecting said second pressure space with said first pressure space; a one-way valve in said passage means permitting pressure fluid in said hollow ram means to flow from said second pressure space into said first pressure space while preventing flow in the opposite direction; means for feeding pressure fluid into said first pressure space to cause said ram means to move from a starting position to said work supporting surface and to cause thereby said plunger means to move in the same direction, whereby when the closed end of the ram means engages a workpiece on said supporting surface said ram means will be stopped while said plunger means will continue to move under its inertia further into said ram means and displace pressure fluid from said second pressure space into said first pressure space to provide a sudden increase of pressure of said ram means against said workpiece; and means cooperating with said ram means after the latter has performed its working operation to move said ram means back to its starting position and said piston of said plunger means away from said closed end of said ram means.

8. In a fluid operated forging press, in combination, support means having a supporting surface adapted to support a workpiece; upright cylinder means mounted on said support means and having an open end facing said supporting surface; elongated hollow ram means extending fluidtightly sealed through said open end of said cylinder means and having a closed end facing said work supporting surface and an active face facing the other end of said cylinder means and defining therewith a first pressure space adapted to contain a pressure fluid, said ram means being slidably guided in said cylinder means between a retracted position spaced from a workpiece on said supporting surface and a working position in which said closed end of said ram means engages the workpece, the interior of said ram means being adapted to be filled wtih pressure fluid; plunger means having a heavy mass extending through said other end of said hollow ram means in the latter and having in said hollow ram means a piston defining between said piston and said closed end of said ram means a second pressure space adapted to be filled with pressure fluid; passage means connecting said second pressure space with said first pressure space; a one-way valve in said passage means permitting pressure fluid in said hollow ram means to flow from said second pressure space into said first pressure space while preventing flow in the opposite direction; fluid-operated retraction means including a stationary cylinder and a retracting piston connected to said ram means, said retracting piston having an active surface considerably smaller than that of said ram means; means for feeding pressure fluid into said cylinder of said retracting means; conduit means connecting said cylinder of said retracting means with said first and said second pressure space; and means cooperating with said conduit means to cause pressure fluid to flow into said first pressure space so that said ram means will move toward said work supporting surface and said plunger means will move in the same direction until said closed end of said ram means will engage the workpiece to stop said ram means while said plunger means will continue under its inertia to move further into said ram means to displace pressure fluid from said second pressure space into said first pressure space to provide a sudden increase of pressure of said ram means against said workpiece, and to permit after said ram means has performed its working operation discharge of pressure fluid from said first pressure space so that the retracting means will move said ram means to its retracted position and to feed pressure fluid into said second pressure space to move said piston of said plunger means away from said closed end of said ram means.

9. In a fluid operated forging press, in combination, primary cylinder means adapted to contain a pressure fluid; a reciprocable hollow ram slidable in said primary cylinder means and having a closed end adapted to transmit working impact upon a workpiece, said hollow ram forming a cylinder of a secondary cylinder means and being adapted to contain a pressure fluid; a plunger having a heavy mass and having a portion which forms a piston in said secondary cylinder means, the cross-section of said piston being smaller than the cross-section of said hollow ram in said primary cylinder means; a passage connecting said primary cylinder means to said secondary cylinder means; a check valve in said passage adapted to be opened by fluid flowing from said secondary cylinder means to said primary cylinder means; fluid operated retraction means connected to said ram; duct means connecting said fluid-operated retraction means with said primary cylinder means and said secondary cylinder means in order to conduct fluid of the retraction means into said primary and said secondary cylinder means to move said ram towards the workpiece and said plunger relative to said ram; a first valve means in said duct means between said retraction means and said primary cylinder means; a source of pressure fluid adapted to feed pressure fluid into said retraction means; second valve means operable to control flow of fluid to said retraction means; and third valve means to control discharge of pressure fluid from said secondary cylinder means at the end of the return stroke.

References Cited by the Examiner

UNITED STATES PATENTS

| | | | |
|---|---|---|---|
| 294,085 | 2/84 | Schutte | 60—54.5 |
| 1,269,220 | 6/18 | Sanders | 29—552 |
| 1,571,737 | 2/26 | Schanandoah | 29—552 |
| 2,784,619 | 3/57 | Braver et al. | 78—42 |
| 2,980,013 | 4/61 | Swick | 100—257 |
| 3,031,903 | 5/62 | Billen et al. | 78—42 |
| 3,064,507 | 11/62 | Strugala | 78—18 |
| 3,084,512 | 4/63 | Huelskamp | 60—52 |

FOREIGN PATENTS

| | | |
|---|---|---|
| 330,855 | 7/03 | France. |
| 186,802 | 7/07 | Germany. |

CHARLES W. LANHAM, *Primary Examiner.*

RICHARD H. EANES, *Examiner.*